(12) United States Patent
Kindel, Jr.

(10) Patent No.: US 12,001,572 B2
(45) Date of Patent: Jun. 4, 2024

(54) SYSTEMS AND METHODS FOR GENERATING ARTIFICIAL AUTOMATION DATA TO PROTECT ACTUAL AUTOMATION DATA

(71) Applicant: Snap One, LLC, Salt Lake City, UT (US)

(72) Inventor: Charles Edward Kindel, Jr., Bellevue, WA (US)

(73) Assignee: Snap One, LLC, Lehi, UT (US)

( * ) Notice: Subject to any disclaimer, the term of this patent is extended or adjusted under 35 U.S.C. 154(b) by 0 days.

(21) Appl. No.: 16/410,439

(22) Filed: May 13, 2019

(65) Prior Publication Data

US 2020/0364357 A1    Nov. 19, 2020

(51) Int. Cl.
*G06F 21/60* (2013.01)
*G05B 23/02* (2006.01)
(Continued)

(52) U.S. Cl.
CPC .......... *G06F 21/606* (2013.01); *G05B 23/02* (2013.01); *G06F 16/903* (2019.01); *G06F 21/6254* (2013.01); *G05B 2223/06* (2018.08)

(58) Field of Classification Search
CPC .......... H04N 21/4126; H04N 21/4668; H04N 21/84; H04N 21/232; H04N 21/25875; H04N 21/26258; H04N 21/4113; H04N 21/4122; H04N 21/422; H04N 21/42219; H04N 21/4302; H04N 21/431; H04N 21/432; H04N 21/435; H04N 21/436; H04N 21/43615; H04N 21/44222; H04N 21/44227; H04N 21/4532; H04N 21/4627; H04N 21/472; H04N 21/4722; H04N 21/475; H04N 21/4753; H04N 21/4782; H04N 21/482; H04N 21/4825; H04N 21/4826; H04N 21/6125; H04N 21/6175; H04N 21/632; H04N 21/64322; H04N 21/8456; H04N 21/858; H04N 21/8586; H04N 5/23229; H04N 7/18; H04N 7/183; H04L 63/08; H04L 63/101; H04L 63/1483; H04L 63/0407; H04L 63/0414; H04L 63/0421; H04L 61/2015; H04L 61/2038; H04L 61/3025; H04L 61/6022; H04L 61/609; H04L 63/083; H04L 63/0876; H04L 63/1416; H04L 63/1425; H04L 63/1441; H04L 63/20; H04L 67/125; H04L 67/141; H04L 67/16; H04L 67/18; H04L 67/24; H04L 67/306; H04L 69/18;
(Continued)

(56) References Cited

U.S. PATENT DOCUMENTS

8,116,749 B2 * 2/2012 Proctor, Jr. ........... H04W 4/029
                                                   455/414.3
9,571,275 B1 * 2/2017 Pattan .................. H04L 47/748
(Continued)

*Primary Examiner* — Dionne Pendleton (57) ABSTRACT

An automation server is described. The automation server includes a processor. The automation server also includes a memory in electronic communication with the processor. The automation server further includes instructions stored in the memory. The instructions are executable to generate artificial automation data to protect actual automation data. The instructions are also executable to send, from the automation server, the artificial automation data to at least one virtual assistant server.

18 Claims, 8 Drawing Sheets

(51) Int. Cl.
*G06F 16/903* (2019.01)
*G06F 21/62* (2013.01)

(58) Field of Classification Search
CPC .......... H04L 2209/42; H04L 2463/121; H04L 41/0806; H04L 41/0809; H04L 41/12; H04L 47/748; H04L 63/0428; H04L 63/0442; H04L 63/10; H04L 63/12; H04L 63/126; H04L 63/145; H04L 67/01; H04L 67/02; H04L 67/12; H04L 67/146; H04L 67/60; H04L 9/0866; H04M 15/06; H04M 15/83; H04M 2203/2005; H04M 3/42059; H04M 3/436; H04W 12/06; H04W 12/10; H04W 12/12; H04W 48/18; H04W 4/16; H04W 4/24; H04W 8/205; H04W 12/02; H04W 12/04; H04W 24/10; H04W 4/023; H04W 4/029; H04W 4/21; H04W 4/50; H04W 4/60; H04W 4/80; H04W 76/11; H04W 88/06; H04W 8/005; H04W 8/26; H04W 12/069; H04W 12/63; H04W 4/70; G06F 21/6254; G06F 11/3409; G06F 21/552; G06F 21/60; G06F 9/46; G06F 16/258; G06F 21/567; G06F 21/602; G06K 9/00221; G06Q 10/0875; G06Q 20/202; G06Q 20/3224; G06Q 20/3278; G06Q 20/384; G06Q 20/385; G06Q 20/386; G06Q 20/4016; G06Q 30/0207; G06Q 30/0222; G06Q 30/0226; G06Q 30/0242; G06Q 30/0261; G06Q 30/0282; G06Q 30/0601; G06Q 30/0623; G06Q 50/01; G06Q 10/20; G06Q 30/016; G06Q 50/06; G06T 1/60; G06T 2200/24; G06T 2207/20104; G06T 2207/30232; G06T 5/001; G06T 7/11; F17D 5/06; G05B 23/0221; G05B 23/027

See application file for complete search history.

(56) References Cited

U.S. PATENT DOCUMENTS

| | | | | |
|---|---|---|---|---|
| 10,291,477 | B1* | 5/2019 | Askar | H04W 4/50 |
| 2014/0129628 | A1* | 5/2014 | Fletcher | H04W 12/02 |
| | | | | 709/204 |
| 2016/0277435 | A1* | 9/2016 | Salajegheh | G06F 11/3409 |
| 2017/0323098 | A1* | 11/2017 | Denier | G06F 21/53 |
| 2018/0082082 | A1* | 3/2018 | Lowenberg | G06Q 20/10 |
| 2018/0287806 | A1* | 10/2018 | Carboni | G06F 17/16 |
| 2020/0007758 | A1* | 1/2020 | Park | H04L 63/0876 |
| 2020/0065521 | A1* | 2/2020 | Durvasula | H04L 63/0421 |
| 2021/0004488 | A1* | 1/2021 | Lapushkin | H04L 63/0421 |
| 2021/0301985 | A1* | 9/2021 | Brown | G05B 23/0221 |

* cited by examiner

Actual Automation Data 438

| Name | ID # |
|---|---|
| Family Room | 1 |
| Kitchen | 2 |
| Mom's Room | 4 |
| TV 1 | 101 |
| Porch Light | 201 |
| Garage Door | 301 |
| | |
| | |
| | |
| | |
| | |
| | |
| | |
| | |
| | |
| | |

Artificial Automation Data 440

| Artificial Name | Artificial ID # |
|---|---|
| | 547 |
| | 987 |
| | 7979 |
| | 5 |
| | 1013 |
| | 234 |
| Game Console | 876 |
| Kitchenette | 3 |
| Office | 13256 |
| Side Light | 100101 |
| Bedroom 6 | 7563 |
| Dining | 14980 |
| Back Door Lock | 89675 |
| Baby Room | 76554 |
| Master Bath | 35467 |
| Master Bedroom | 3654 |
| Dave's Room | 9999 |
| Music Room | 9760 |
| TV | 4 |

Sent Automation Data 442

| Name | ID # |
|---|---|
| Master Bath | 35467 |
| Master Bedroom | 1 |
| Mom's Room | 7979 |
| Dave's Room | 9999 |
| Baby Room | 76554 |
| Bedroom 6 | 7563 |
| Family Room | 547 |
| TV | 4 |
| Game Console | 876 |
| TV 1 | 5 |
| Office | 13256 |
| Dining | 14980 |
| Porch Light | 1013 |
| Side Light | 100101 |
| Kitchenette | 3 |
| Kitchen | 987 |
| Back Door Lock | 89675 |
| Garage Door | 234 |
| Music Room | 9760 |

SYSTEMS AND METHODS FOR GENERATING ARTIFICIAL AUTOMATION DATA TO PROTECT ACTUAL AUTOMATION DATA

TECHNICAL FIELD

The present disclosure relates generally to electronic devices. More specifically, the present disclosure relates to systems and methods for generating artificial automation data to protect actual automation data.

BACKGROUND

In recent years, the price of electronic devices has decreased dramatically. In addition, the size of electronic devices has continued to decrease. Further, electronic devices continue to increase in capability and convenience.

Decreasing prices and increasing capabilities of electronic devices has permitted modern devices to be conveniently used in homes and businesses. Many homes and businesses include multiple electronic devices to assist in everyday tasks. For example, electronic devices may be used for convenience and/or entertainment.

As the use of electronic devices has increased, greater amounts of information have been produced and spread by the electronic devices. As can be observed from this discussion, improvements to managing electronic device information may be beneficial.

DETAILED DESCRIPTION

An automation server is described. The automation server includes a processor. The automation server also includes a memory in electronic communication with the processor. The automation server further includes instructions stored in the memory. The instructions are executable by the processor to generate artificial automation data to protect actual automation data. The instructions are also executable to send, from the automation server, the artificial automation data to at least one virtual assistant server.

The artificial automation data may include artificial device identifiers. The artificial automation data may include artificial entity names.

The instructions may be executable to send the artificial entity names with actual entity names. The artificial entity names may not represent actual entities.

The artificial automation data may include artificial state data. The artificial state data may indicate at least one artificial state change.

The instructions may be executable to send the artificial state data proactively. The instructions may be executable to send the artificial state data in response to a query from the at least one virtual assistant server that is not associated with a user request.

The instructions may be executable to determine that a query from the at least one virtual assistant server is associated with a user request. The instructions may be executable to send actual state data in response to determining that the query is associated with the user request.

A method is also described. The method includes generating artificial automation data to protect actual automation data. The method also includes sending, from at least one automation server, the artificial automation data to at least one virtual assistant server.

A non-transitory computer-readable medium is also described. The computer-readable medium includes executable instructions for generating artificial automation data to protect actual automation data. The computer-readable medium also includes executable instructions for sending, from an automation server, the artificial automation data to at least one virtual assistant server.

Some configurations of the systems and methods disclosed herein may relate to protecting data. Some kinds of data may be sensitive with regards to user privacy and/or safety. For example, data that indicates or that may be used to determine user location, behavior, interests, preferences, etc., may be considered private and/or may impact user safety. Automation data is an example of data that may be sensitive.

Automation data is data that relates to the control and/or state of one or more automation devices. Examples of automation devices may include lights, thermostats, appliances (e.g., refrigerators, furnaces, air conditioners, dish washers, laundry washers, laundry dryers), televisions, computers, networking equipment (e.g., routers, modems, switches, etc.), audio/video (A/V) receivers, media players, servers, tablet devices, smart phones, sprinkling systems, security systems, locks (e.g., door locks, window locks, etc.), sensors (e.g., door sensors, window sensors, heat sensors, motion sensors, etc.), cameras, speakers, space heaters, game consoles, vehicles, automobiles, aircraft, etc.

In some configurations, automation data includes control data (e.g., queries, instructions, commands, requests, codes, etc.). For instance, automation data may include control data that indicates (e.g., queries, commands, instructs, requests, etc.) an operation or operations for an automation device. For example, automation data may include a command to deactivate a light, a command to change a thermostat temperature, a command to start a dish washer, a command to change a television channel, a command to activate a game console, a command to play music, a command to activate a security system, a command to adjust a camera angle, a command to capture video, a command to access a computer, a command to activate a sprinkling system, etc.

In some configurations, automation data includes state data. For example, automation data may include state data indicating a light state (e.g., off or on), thermostat temperature, dish washer state (e.g., open, running, wash complete, etc.), a current television channel, current game console state (e.g., on or off, media being played, etc.), an A/V receiver state (e.g., whether playing media, media being played, volume, etc.), security system state, a sprinkling system state, door state (e.g., open or closed), lock state (e.g., unlocked or locked), etc.

Automation data may indicate and/or may be used to determine user location, behavior, interests, preferences, etc. For example, automation data may indicate when a user is at home or away, may indicate when and what types of media are consumed by a user, may indicate a number of bedrooms in a user's home, may indicate which room(s) are occupied (and potentially by whom), may indicate a number of automation devices (and/or types of automation devices) in a user's home, may indicate when a home or business is secure, may indicate a security camera video feed, may indicate when a bathroom is used, may indicate a user's interests (e.g., sports, games, politics, etc.), etc. Accordingly, automation data may be sensitive, as it may impact a user's privacy and/or safety. For example, a third party might use access to automation data to target advertising to a user. Some third parties (e.g., bad actors) might use access to automation data to disclose private information, harm a user's reputation, or steal a user's goods.

As used herein, a virtual assistant device is a device that can perform one or more functions based on user input. For example, a virtual assistant may retrieve information from and/or may be utilized to control one or more other devices (e.g., automation devices). One example of a virtual assistant device is a smart speaker that can receive verbal commands and perform one or more functions based on a verbal command. In some configurations, a virtual assistant device may receive user input that indicates a user request for state data from an automation device or for an automation device to perform a particular function. A potential privacy and/or safety issue may arise in this context. For example, a platform (e.g., virtual assistant server(s) and/or virtual assistant device(s)) that enables control of the automation device(s) and/or that accesses state data from the automation device(s) may obtain access to sensitive data. Some users may desire that their sensitive data be kept private from the platform, in order to diminish risk that the sensitive data might be compromised or accessed by a bad actor. Some configurations of the systems and methods disclosed herein may be beneficially utilized to reduce the sharing of sensitive data and/or to obfuscate sensitive data such that data sharing with the platform will avoid providing useful or meaningful information (about a user, a user's behaviors, and/or a user's property) to the platform.

As used herein, the term "couple" and other variations thereof (e.g., "coupled," "coupling," etc.) may mean that one element is connected to another element directly or indirectly. For example, if a first element is coupled to a second element, the first element may be connected directly to the second element (without any intervening element, for example) or may be connected to the second element through one or more other elements. Some lines in one or more of the Figures (e.g., in the block diagrams) may indicate couplings and/or communication links (e.g., wired or wireless communication links).

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods. As used herein, the term "plurality" may indicate two or more. For example, a plurality of components may refer to two or more components.

Figure 1:
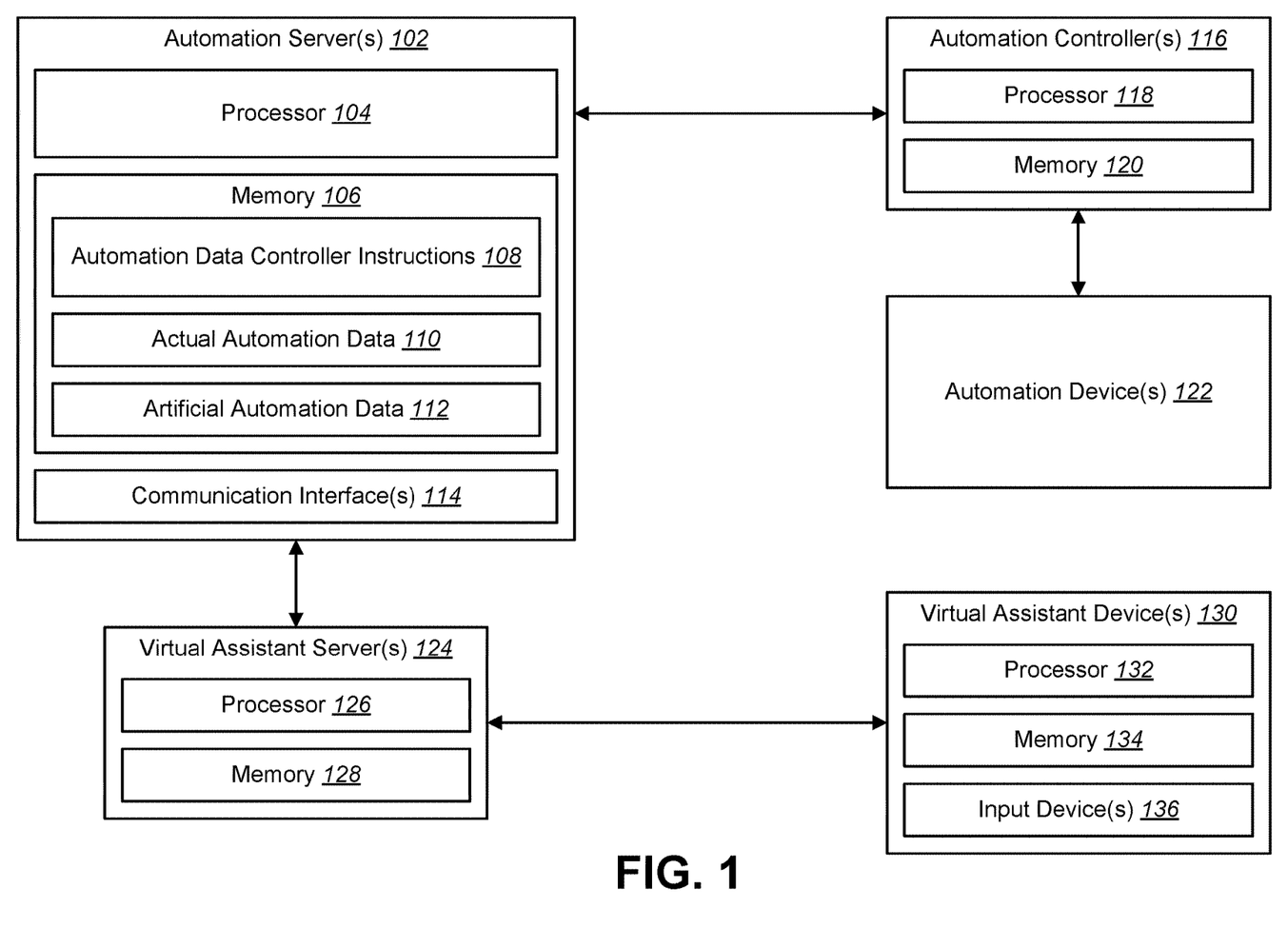
FIG. 1 is a block diagram illustrating one example of one or more automation servers in which systems and methods for generating artificial automation data to protect actual automation data may be implemented.

FIG. 1 is a block diagram illustrating one example of one or more automation servers 102 in which systems and methods for generating artificial automation data to protect actual automation data may be implemented. An automation server 102 is an electronic device that is configured to communicate with one or more automation controllers 116 and/or one or more automation devices 122. For example, an automation server 102 may send automation data to one or more automation controllers 116 and/or one or more automation devices 122. Additionally or alternatively, the automation server 102 may receive automation data from one or more automation controllers 116 and/or one or more automation devices 122. As used herein, an "automation server" may refer to one or more automation servers.

The automation server 102 may include one or more components or elements. One or more of the components or elements may be implemented in hardware (e.g., circuitry), a combination of hardware and software (e.g., a processor with instructions), and/or a combination of hardware and firmware.

In some configurations, the automation server 102 may include a processor 104, a memory 106, and/or one or more communication interfaces 114. The processor 104 may be coupled to and/or linked to (e.g., in electronic communication with) the memory 106 and/or communication interface(s) 114.

In some configurations, the automation server 102 may be configured to perform one or more of the functions, procedures, methods, steps, etc., described in connection with one or more of FIGS. 1-8. Additionally or alternatively, the automation server 102 may include one or more of the structures described in connection with one or more of FIGS. 1-8.

The memory 106 may store instructions and/or data. The processor 104 may access (e.g., read from and/or write to) the memory 106. Examples of instructions and/or data that may be stored by the memory 106 may include automation data controller instructions 108, actual automation data 110, artificial automation data 112, and/or instructions and/or data for other elements, etc.

The communication interface 114 may enable the automation server 102 to communicate with one or more other devices (e.g., automation controller(s) 116, automation device(s) 122, virtual assistant server(s) 124, and/or one or more other devices). For example, the communication interface 114 may provide an interface for wired and/or wireless communications. In some configurations, the communication interface(s) 114 may communicate with one or more other devices (e.g., automation controller(s) 116, automation device(s) 122, virtual assistant server(s) 124, etc.) over one or more networks (e.g., the Internet, wide-area network (WAN), local area network (LAN), etc.). In some configurations, the communication interface 114 may be coupled to one or more antennas for transmitting and/or receiving radio frequency (RF) signals. For example, the communication interface 114 may enable one or more kinds of wireless (e.g., cellular, wireless local area network (WLAN), personal area network (PAN), etc.) communication. Additionally or alternatively, the communication interface 114 may enable one or more kinds of cable and/or wireline (e.g., Universal Serial Bus (USB), Ethernet, High Definition Multimedia Interface (HDMI), fiber optic cable, etc.) communication.

In some configurations, multiple communication interfaces 114 may be implemented and/or utilized. For example, one communication interface 114 may be an Ethernet interface, another communication interface 114 may be a universal serial bus (USB) interface, another communication interface 114 may be a wireless local area network (WLAN) interface (e.g., Institute of Electrical and Electronics Engineers (IEEE) 802.11 interface), and another communication interface 114 may be a cellular (e.g., 3G, Long Term Evolution (LTE), Code-Division Multiple Access (CDMA), etc.) communication interface 114.

In some configurations, the automation server 102 may communicate with one or more automation controllers 116, one or more automation devices 122, one or more virtual assistant servers 124, one or more control devices, one or more virtual assistant device(s) 130, and/or one or more other devices. For example, the automation server 102 may utilize the communication interface(s) 114 to communicate with the one or more automation controllers 116, one or more automation devices 122, one or more control devices, one or more virtual assistant servers 124, and/or one or more other devices (e.g., electronic devices). As described above, one or more of communications may be carried out over one or more networks (e.g., the Internet, WLAN, Zigbee, etc.) and/or over one or more wired and/or wireless links.

Examples of the one or more automation controllers 116 include home controllers, building automation controllers, building automation systems, servers, computers, security systems, network devices, etc. In some configurations, the automation controller(s) 116 may be located in a building, home, business, vehicle, etc., and/or may be integrated into one or more devices (e.g., vehicles, mobile devices, etc.). One or more of the automation controllers 116 may include a respective processor 118 and memory 120. For example, an automation controller 116 may include executable instructions for controlling one or more automation devices 122 (e.g., local device control instructions, such as local volume control instructions, light activation instructions, media selection instructions, media play instructions, thermostat adjustment instructions, etc.) and/or executable instructions for implementing control commands from the automation server 102. Additionally or alternatively, an automation controller 116 may include executable instructions for obtaining state data from one or more automation devices 122 (e.g., lock state, door state, security system state, light state, application state, etc.) and/or executable instructions for providing state data to the automation server(s) 102. In some examples, one or more of the automation controllers 116 may include a communication interface to communicate with the automation server(s) 102 and/or the automation device(s) 122. In some configurations, one or more of communications may be carried out over one or more networks (e.g., the Internet, WLAN, Zigbee, etc.) and/or over one or more wired and/or wireless links. In some configurations, an automation controller 116 may be integrated into an automation device 122. In some configurations, an automation device 122 may be integrated into an automation controller 116.

As discussed above, examples of automation devices 122 may include lights, thermostats, appliances (e.g., refrigerators, furnaces, air conditioners, dish washers, laundry washers, laundry dryers), televisions, computers, networking equipment (e.g., routers, modems, switches, etc.), audio/video (A/V) receivers, media players, servers, tablet devices, smart phones, sprinkling systems, security systems, locks (e.g., door locks, window locks, etc.), sensors (e.g., door sensors, window sensors, heat sensors, motion sensors, etc.), cameras, speakers, space heaters, game consoles, vehicles, automobiles, aircraft, etc. Each of the automation device(s) 122 may perform one or more functions, such as providing light, dimming, refrigeration, washing, displaying, locking, securing, cleaning, entertainment, etc.

One example of the automation device(s) 122 may be an audio/video receiver that receives audio from the automation controller(s) 116 and/or automation server(s) 102. Another example of the automation device(s) 122 may be a set of lights that may be activated, deactivated, and/or dimmed by the automation controller(s) 116. Another example of the automation device(s) 122 may be a security system that may be armed or disarmed by the automation controller(s) 116. Another example of the automation device(s) 122 may be a television that may be controlled by the automation controller(s) 116 (e.g., the automation controller(s) 116 may command the television to activate, deactivate, switch to a particular channel, to adjust volume, to access media (e.g., a streaming service), etc.). Another example of the automation device(s) 122 may be an electronic door lock that may be locked or unlocked by the automation controller(s) 116 and/or that may provide a lock state to the automation controller(s) 116 (for user alerts, for example). Another example of the automation device(s) 122 may be a window sensor that provides a state (e.g., opened or closed and/or locked or unlocked) to the automation controller(s) (for user alerts, for example). In some configurations, one or more of the automation device(s) 122 may correspond to an area. For example, each of the automation device(s) 122 may correspond to a room in a building (e.g., home, business, etc.) and/or to a zone (e.g., zone in a vehicle cabin, zone in an airplane cabin, zone in a showroom, zone in a theater, etc.). For instance, each of the automation device(s) 122 may locally provide lighting and/or audio in an area.

As illustrated in FIG. 1, the automation server(s) 102 may be in communication with one or more virtual assistant servers 124. For example, the automation server(s) 102 may communicate with the virtual assistant server(s) 124 via one or more networks (e.g., Internet, WAN, LAN, etc.). The virtual assistant server(s) 124 may be in communication with one or more virtual assistant devices 130 via one or more networks (e.g., Internet, WAN, LAN, etc.). For example, the virtual assistant server(s) 124 and/or the virtual assistant device(s) 130 may include communication interfaces (not shown in FIG. 1) for wired and/or wireless communication.

In some configurations, the automation server(s) 102 and/or automation controller(s) 116 may be in communication with a control device (e.g., smart phone, tablet device, control panel, smart television, smart watch, computer, laptop, server, virtual assistant server 124, virtual assistant device 130, etc.) that may provide control information to the automation server(s) 102 and/or automation controller(s) 116. For example, a control device may include a user interface for controlling one or more operations of and/or settings for the automation server(s) 102 and/or automation controller(s) 116. For instance, the control device may include a user interface that captures audio, captures video, and/or presents interactive controls (e.g., sliders, knobs, buttons, number fields, text fields, etc.). The control device may receive input (e.g., audio, touchscreen input, taps, drags, mouse clicks, keypad input, virtual keyboard input, physical keyboard input, camera input, gestures, eye movements, blinks, etc.) associated with one or more operations and/or settings. The control device may send a query to the automation server(s) 102 and/or automation controller(s) 116. The automation server(s) 102 and/or automation controller(s) 116 may utilize the query to perform one or more operations and/or adjust one or more settings. The virtual assistant device(s) 130 may be an example of a control device.

The virtual assistant device(s) 130 may include a processor 132, memory 134, and/or one or more input devices 136. Examples of the input device(s) 136 may include sensors, microphones, cameras, motion sensors, touchscreens, touchpads, buttons, etc. The virtual assistant device(s) 130 may receive input via the input device(s) 136. In some cases, the input may be associated with a user request (for data or for an operation, for instance). One example of a virtual assistant device 130 is a smart speaker that includes a microphone. The microphone captures input sound representing user speech. In other examples, the input device(s) 136 may capture one or more inputs (e.g., touch events, gestures, button presses, keystrokes, etc.) representing user input.

In some configurations, the virtual assistant device(s) 130 may include and/or may be linked to one or more displays. The display(s) may present visual content (e.g., user interface, images, video, graphics, symbols, characters, etc.). The display(s) may be implemented with one or more display technologies (e.g., liquid crystal display (LCD), organic light-emitting diode (OLED), plasma, cathode ray tube (CRT), etc.). The display(s) may be integrated into the virtual assistant device(s) 130 or may be coupled to the virtual assistant device(s) 130.

In some configurations, the virtual assistant device(s) 130 may present a user interface on the display(s). For example, the user interface may enable a user to interact with the virtual assistant device(s) 130. For instance, the user interface on the display may present interactive controls (e.g., sliders, knobs, buttons, number fields, text fields, etc.). The virtual assistant device(s) 130 may receive input (e.g., touchscreen input, taps, drags, mouse clicks, keypad input, virtual keyboard input, physical keyboard input, etc.) associated with one or more operations and/or settings. The virtual assistant device(s) 130 may send a signal to the virtual assistant server(s) 124 based on the input. In some configurations, the display may be a touchscreen that receives input from physical touch (by a finger, stylus, or other tool, for example). Additionally or alternatively, the virtual assistant device(s) 130 may include or be coupled to another input interface. For example, the virtual assistant device(s) 130 may include a camera and may detect user gestures (e.g., hand gestures, arm gestures, eye tracking, eyelid blink, etc.). In another example, the virtual assistant device(s) 130 may be linked to a mouse and may detect a mouse click. In yet another example, the virtual assistant device(s) 130 may be linked to one or more other controllers (e.g., game controllers, joy sticks, touch pads, motion sensors, etc.) and may detect input from the one or more controllers.

A virtual assistant device 130 may format (e.g., digitize, encode, modulate, etc.) the input and send one or more signals to the virtual assistant server(s) 124 based on the input. A virtual assistant server 124 may include a processor 126 and memory 128. The virtual assistant server 124 may be an electronic device (e.g., web server, computer, etc.) that is configured to interoperate with the virtual assistant device(s) 130. In some configurations, the virtual assistant server 124 may maintain a record of entities (e.g., automation device(s) 122, groups of automation device(s) 122, rooms, doors, etc.) in memory 128. For example, the record may include identification numbers, names, and/or states for automation device(s) 122, groups of automation devices 122, and/or objects (e.g., doors, rooms, etc.) corresponding to automation device(s) 122.

In some examples, a virtual assistant server 124 may generate a query (e.g., a request for data or for an operation) based on one or more signals from the virtual assistant device(s) 130. In some configurations, generating a query may include determining an identification number corresponding to an entity name. For instance, a virtual assistant server 124 may receive a signal representing user speech. The virtual assistant server 124 may perform speech recognition based on the signal to produce a query. In other examples, the signal may represent a user input (e.g., tap, touch, click, gesture, etc., from a user interface) corresponding to an operation or request. The virtual assistant server 124 may produce the query based on the signal that represents the user input. The signal may indicate an operation, request, and/or entity name.

In an example, assume that a user addresses a virtual assistant device 130 and says "turn on the living room lights." The virtual assistant device 130 may capture the user's speech, digitize the speech, and send the speech as a signal to a virtual assistant server 124. The virtual assistant server 124 may perform speech recognition based on the signal and determine that the speech indicates a user request to activate lights in a living room. The virtual assistant server 124 may search the record in memory 128 for an automation device 122 (or group of automation devices 122) with a name "living room lights." The record may indicate a mapping between the name "living room lights" and an identification number corresponding to an automation device 122 that is a switch for the living room lights. The virtual assistant server 124 may generate a query to activate an automation device 122 with the device identification number, where the query is flagged as a user request. The virtual assistant server 124 may send the query to the automation server 102. The automation server 102 may send the query to the automation controller 116, which may control the automation device 122 (the switch in this example) to activate lights in a living room.

In another example, assume that a user addresses a virtual assistant device 130 and says, "is the front door locked?" The virtual assistant device 130 may capture the user's speech, digitize the speech, and send the speech as a signal to a virtual assistant server 124. The virtual assistant server 124 may perform speech recognition based on the signal and determine that the speech indicates a user request for a state of a front door lock. The virtual assistant server 124 may search the record in memory 128 for an automation device 122 (or group of automation devices 122) with a name "front door lock" or a similar name. The record may indicate a mapping between the name "front door lock" and an identification number corresponding to an automation device 122 that is an electronic lock for a front door. The virtual assistant server 124 may generate a query to obtain the state of an automation device 122 with the device identification number, where the query is flagged as a user request (and/or as associated with a user request). The virtual assistant server 124 may send the query to the automation server 102. The automation server 102 may send the query to the automation controller 116, which may retrieve the state of the automation device 122 (the front door lock in this example). Upon retrieving the state of the front door lock, the automation controller 116 may send a signal indicating the state to the automation server 102, which may send an indicator to the virtual assistant server 124. The virtual assistant server 124 may record the state and/or send an indicator of the state to the virtual assistant device 130. The virtual assistant device 130 may output synthesized speech from a speaker indicating the state of the front door lock.

The foregoing examples illustrate how a virtual assistant server 124 may obtain and/or maintain a record of automation data corresponding to the automation device(s) 122. As discussed above, the record may compromise the privacy and/or safety of a user. For example, the virtual assistant server(s) 124 may perform machine learning on the automation data in the record to learn patterns in user behavior. These patterns could be utilized for suggesting operations (e.g., "do you want me to turn off the lights?"), marketing, and/or other purposes that may be undesirable for some users. Some configurations of the systems and methods disclosed herein may enable generating artificial automation data to protect actual automation data.

In some configurations, the memory 106 on the automation server(s) 102 may store automation data controller instructions 108. The processor 104 may execute the automation data controller instructions 108 to obtain actual automation data 110. Actual automation data 110 is data that authentically represents the automation device(s) 122. For example, the actual automation data 110 may include actual device identifiers (e.g., identification numbers), actual entity names, and/or actual states of the automation device(s) 122. In some configurations, the automation server(s) 102 may obtain the actual automation data 110 by requesting and/or receiving automation data from the automation controller(s) 116. For example, the automation server(s) 102 may send one or more requests for one or more device identifiers (e.g., identification numbers), entity names, and/or states of the automation device(s) 122. The automation controller(s) 116 may obtain (e.g., request and/or receive) the automation data from the automation device(s) 122 and/or send the automation data to the automation server(s) 102, which may record the received automation data as actual automation data 110 in memory 106.

The processor 104 may execute the automation data controller instructions 108 to generate artificial automation data 112 (to protect the actual automation data 110, for example). Artificial automation data 112 is data that does not necessarily represent the automation device(s) 122. For example, the artificial automation data 112 may include artificial device identifiers (e.g., identification numbers), artificial entity names, and/or artificial states. In some configurations, the processor 104 may execute the automation data controller instructions 108 to send, from the automation server(s) 102 the artificial automation data 112 to the virtual assistant server(s) 124. The artificial automation data 112 may conceal, obfuscate, and/or mask the actual automation data 110.

Artificial device identifiers may be included in and/or may be examples of artificial automation data 112. Artificial device identifiers may be numbers and/or character strings that are not valid references to actual automation device(s) 122. Artificial device identifiers may be utilized to conceal a set of device identifiers. Artificial device identifiers may be considered noise. As used herein, "noise" may refer to inaccurate or unreliable data. Providing or adding noise may make deriving meaningful information from automation data more difficult. In some configurations, generating the artificial automation data 112 may include generating artificial device identifiers. For example, the automation server(s) 102 may utilize a random number generator to generate the artificial device identifiers. In other examples, the automation server(s) 102 may utilize another mathematical algorithm (e.g., incrementing and/or decrementing a number by a set or randomized sequence, mapping or encoding actual device identifiers to artificial device identifiers) to generate the artificial device identifiers. The artificial device identifiers may be associated with (e.g., assigned to) actual automation device(s) 122 and/or artificial automation device(s). An artificial device identifier associated with an actual automation device 122 may not be the same as the actual device identifier. For example, an artificial device identifier itself may not be a valid (direct) reference to an actual automation device 122. In some configurations, an automation server 102 may verify that each artificial device identifier is not equal to a corresponding actual device identifier, if any. In a case that the artificial device identifier is equal to a corresponding actual device identifier, the automation server 102 may re-generate the artificial device identifier.

Artificial entity names may be included in and/or may be examples of artificial automation data 112. Artificial entity names may be words, numbers, and/or character strings that are not valid entity names for actual automation device(s) 122 and/or that do not represent actual entities. Artificial entity names may be utilized to add noise to a set of entity names. Adding noise may make identifying actual entity names more difficult and/or may make deriving information from automation data more difficult. In some configurations, generating the artificial automation data 112 may include generating artificial entity names. For example, the automation server(s) 102 may randomly select words and/or characters from a set (e.g., dictionary) of words and/or characters. For instance, a set (e.g., dictionary) of words and/or characters may include terms (e.g., "television," "switch," "storage," "room," "front," "Dave's," "door," "window," "light," "fridge," "family," "basement," "first," "side," "A," "3," etc.) that plausibly could represent an entity. In some approaches, combinations of words and/or characters (e.g., word(s)/character(s) that can be utilized as an adjective with a word/character that can be utilized as a noun) from the set of words and/or characters may be randomly selected (e.g., "Dave's door," "front window," "door 3," "fridge 2," "back light 3," "window B6," etc.). In other examples, the automation server(s) 102 may produce artificial entities names that are gibberish (e.g., "a9sih3," kkjoenc," etc.). In some configurations, the artificial entity names may not be associated with (e.g., assigned to) actual automation device(s) 122. An artificial entity name may or may not be the same as an actual entity name.

In some configurations, the automation data controller instructions 108 may be executed to send the artificial entity names with actual entity names. For example, a number of the artificial entity names and the actual entity names may be greater than an actual number of entities. For instance, the automation server(s) 102 may generate a large amount of artificial entity names (e.g., tens, hundreds, thousands, etc.) to send to the virtual assistant server(s) 124.

Artificial state data may be included in and/or may be examples of artificial automation data 112. Artificial state data may be state changes, timings, words, numbers, and/or character strings that are not necessarily valid state data for actual automation device(s) 122. Artificial state data may be utilized to add noise to a set of state data. For example, artificial state data may obfuscate actual state data (e.g., state data timing). This may make identifying actual state data more difficult and/or may make deriving information from automation data more difficult. In some configurations, generating the artificial automation data 112 may include generating artificial state data. For example, the automation server(s) 102 may generate state data that indicates states that are different from actual states and/or may generate state data with different timings from actual states. For example, if an actual state of a light is on, the automation server(s) 102 may generate an artificial state indicating that a light is off. In another example, if a television channel state is 5.1, the automation server(s) 102 may randomly select a different channel state of 53.2. Additionally or alternatively, the automation server(s) 102 may generate artificial state changes at times where an actual state change did not occur. For example, the automation server(s) 102 may generate artificial state data that indicates a series of state changes (e.g., on, off, on, off, on, off, etc.) and/or that randomly changes states. An artificial state data may or may not be the same as an actual state data at any particular time.

In some configurations, the automation data controller instructions 108 may be executed to send the artificial state data proactively. For example, the automation server(s) 102 may send artificial state data indicating state changes to the virtual assistant server(s) 124 when no actual state change has occurred and/or without a request from the virtual assistant server(s) 124. In some configurations, the automation data controller instructions 108 may be executed to send the artificial state data in response to a query from the virtual assistant server(s) 124 that is not associated with a user request. In a case that the virtual assistant server(s) 124 send a query that is not associated with a user request (e.g., if a query is not flagged as being associated with a user request), for example, the automation server(s) 102 may send the artificial state data in response.

In some configurations, the automation data controller instructions 108 may be executed to determine that a query from the at least one virtual assistant server 124 is associated with a user request. For example, the automation server(s) 102 may receive a query that is flagged as being associated with a user request. The automation data controller instructions 108 may be executed to send actual state data in response to determining that the query is associated with the user request. In a case that the query is flagged as being associated with a user request, for example, the automation server(s) 102 may respond by sending actual state data. This may allow a user to obtain actual state data from the virtual assistant device(s) 130 when an actual request is made. In some examples, sending actual state data for queries that are associated with user requests may allow the actual state data to always be provided and/or utilized from the user's perspective.

In some configurations, one or more of the components or elements described in connection with FIG. 1 may be combined and/or divided. For example, automation data controller instructions 108 may be divided into a number of separate components or elements that perform a subset of the functions associated with the automation data controller instructions 108.

Figure 2:
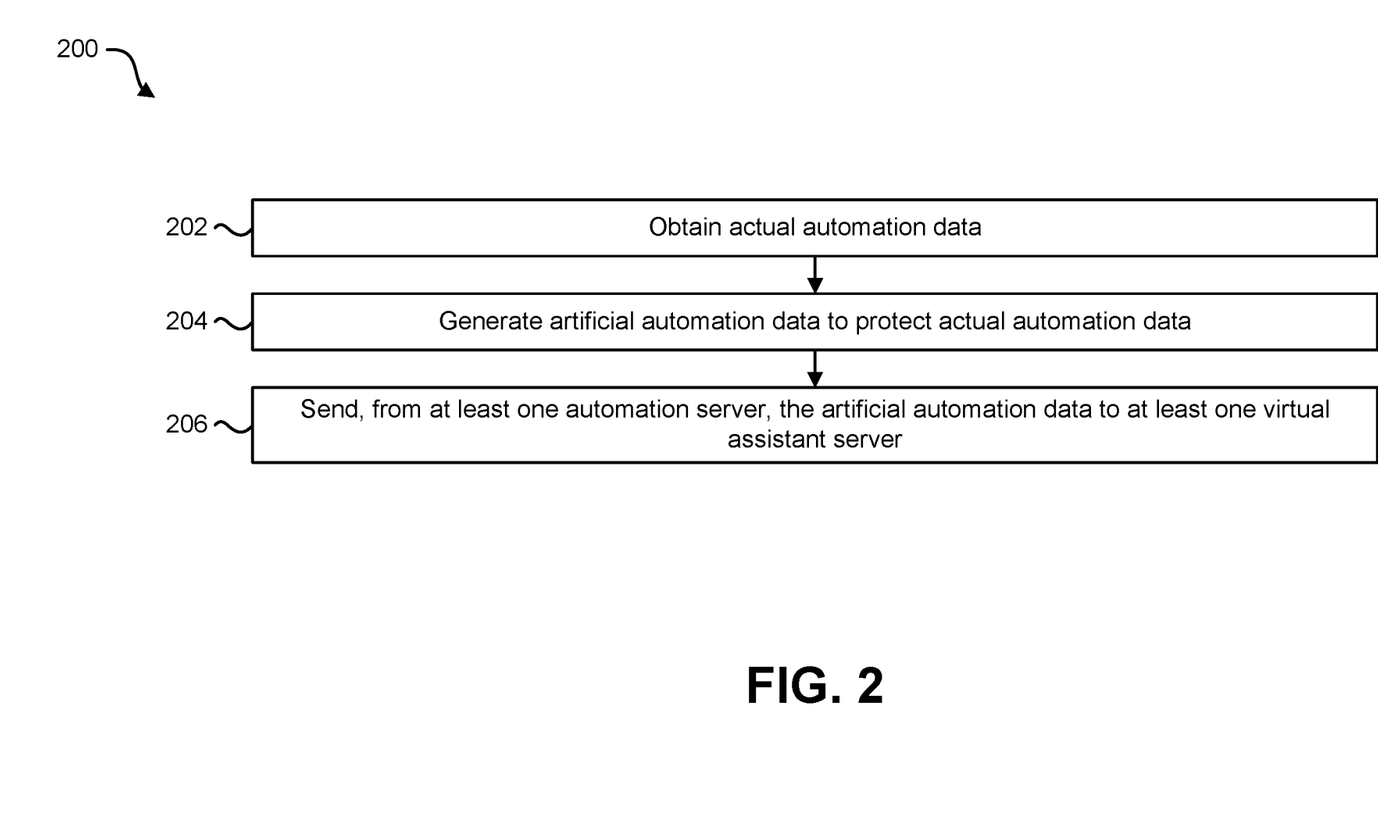
FIG. 2 is a flow diagram illustrating one configuration of a method for generating artificial automation data to protect actual automation data.

FIG. 2 is a flow diagram illustrating one configuration of a method 200 for generating artificial automation data to protect actual automation data. In some configurations, the method 200 may be performed by the one or more automation servers 102 described in connection with FIG. 1 or another device. The automation server 102 may obtain 202 actual automation data. This may be accomplished as described in connection with FIG. 1. For example, the automation server 102 may request and/or receive actual automation data from one or more automation controllers.

The automation server(s) 102 may generate 204 artificial automation data to protect actual automation data. This may be accomplished as described in connection with FIG. 1. For example, the automation server 102 may generate artificial device identifiers, artificial entity names, and/or artificial state data.

The automation server(s) 102 may send 206, from the automation server(s) 102, the artificial automation data to at least one virtual assistant server. This may be accomplished as described in connection with FIG. 1. For example, the automation server 102 may send the artificial automation data to one or more virtual assistant servers via a network (e.g., the Internet) using a communication interface.

Figure 3:
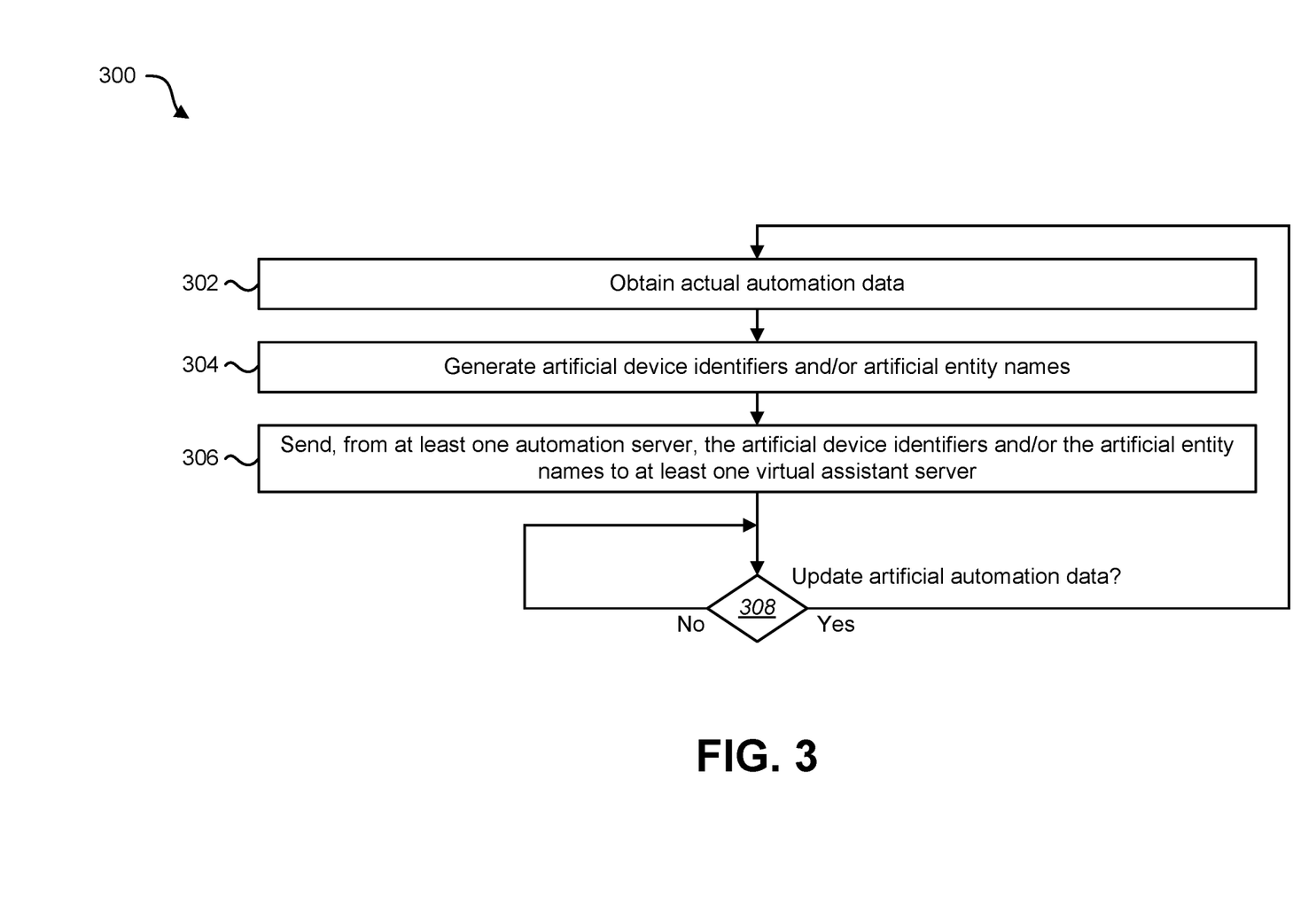
FIG. 3 is a flow diagram illustrating a more specific configuration of a method for generating artificial automation data to protect actual automation data.

FIG. 3 is a flow diagram illustrating a more specific configuration of a method 300 for generating artificial automation data to protect actual automation data. In some configurations, the method 300 may be performed by the one or more automation servers 102 described in connection with FIG. 1 or another device. The automation server 102 may obtain 302 actual automation data. This may be accomplished as described in connection with FIG. 1. For example, the automation server 102 may request and/or receive actual entity names and/or actual device identifiers from an automation controller 116.

The automation server(s) 102 may generate 304 artificial device identifiers and/or artificial entity names. This may be accomplished as described in connection with FIG. 1. For example, the automation server 102 may generate artificial entity names as described in connection with FIG. 1. For example, the automation server 102 may randomly select words, characters, and/or numbers to generate the artificial entity names. Additionally or alternatively, the automation server 102 may generate artificial device identifiers corresponding to actual automation devices and/or artificial automation devices. In some configurations, the artificial device identifiers may be generated randomly, generated using a deterministic mathematical algorithm, and/or generated based on a mapping function from actual device identifiers.

The automation server(s) 102 may send 306, from the automation server(s) 102, the artificial device identifiers and/or the artificial entity names to at least one virtual assistant server. This may be accomplished as described in connection with FIG. 1. For example, the automation server 102 may send the artificial device identifiers and/or artificial entity names to one or more virtual assistant servers via a network (e.g., the Internet) using a communication interface.

The automation server(s) 102 may determine 308 whether to update artificial automation data. In some configurations, for example, the automation server(s) 102 may modify the artificial automation data. For example, the automation server(s) 102 may periodically re-generate artificial automation data by changing the artificial device identifiers and/or artificial entity names. For example, the automation server(s) 102 may track time (e.g., using a clock, time stamps, a timer, etc.) to determine whether an update period has passed since the last set of artificial device identifiers and/or artificial entity names were sent. If the update period has passed, the automation server(s) 102 may determine 308 to update the artificial automation data. For example, the automation server(s) 102 may repeat the method 300. If the update period has not passed, the automation server(s) 102 may not determine 308 to update the artificial automation data.

In some configurations, the automation server(s) 102 may additionally or alternatively determine 308 whether to update the artificial automation data based on whether a query is received from a virtual assistant server. For example, if the automation server(s) 102 receive a query for automation information (e.g., a query for a listing of automation device(s)) from a virtual assistant server, the automation server(s) 102 may determine 308 to update the artificial automation data. For example, the automation server(s) 102 may repeat the method 300.

Figure 4:
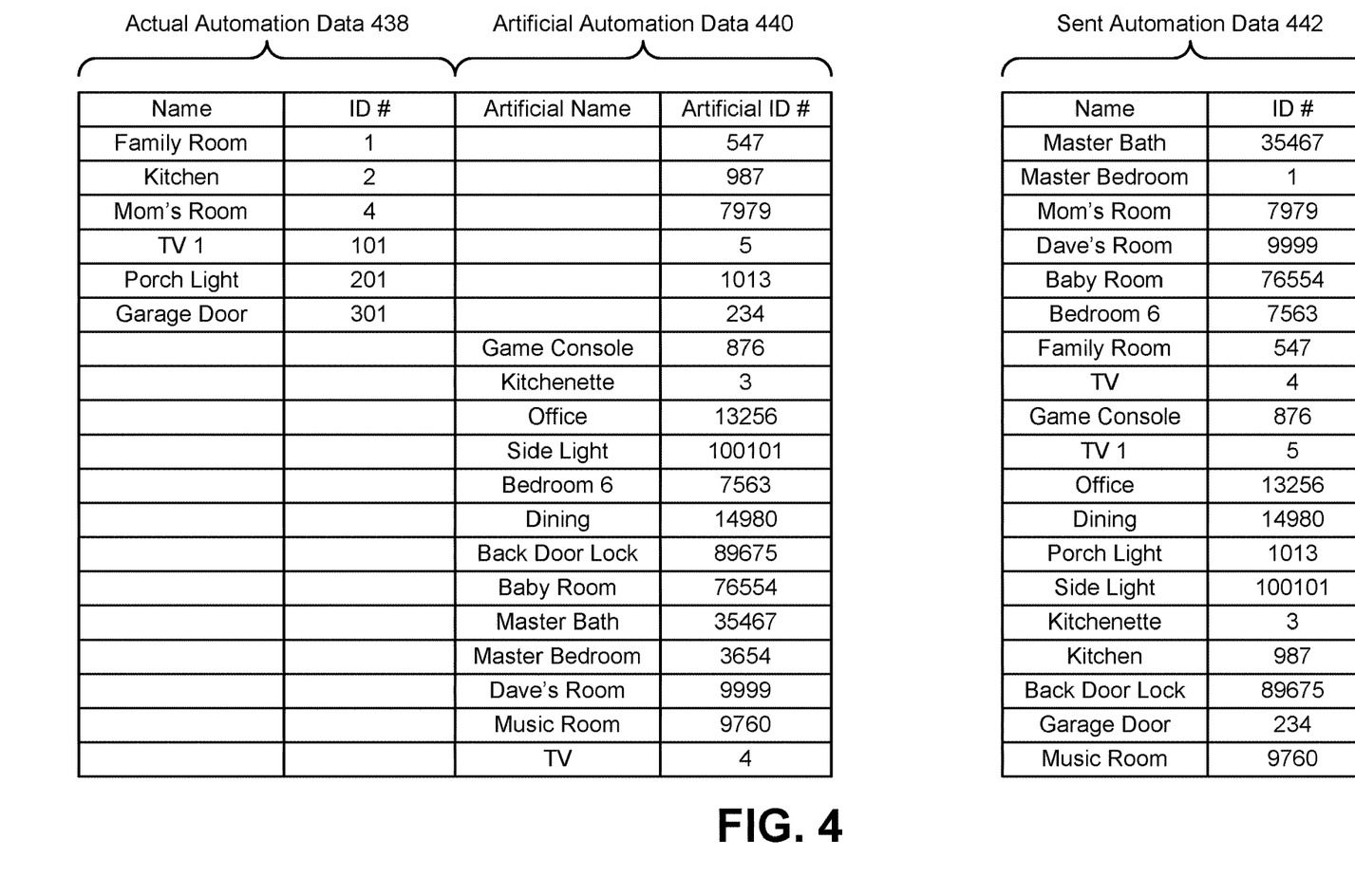
FIG. 4 is a diagram illustrating examples of actual automation data, artificial automation data, and sent automation data.

FIG. 4 is a diagram illustrating examples of actual automation data 438, artificial automation data 440, and sent automation data 442. In this example, the actual automation data 438 includes actual entity names (under "Name") and actual device identifiers (under "ID #"). As can be observed, the entity names correspond to some automation devices and rooms associated with automation devices. In this example, the actual device identifiers are numbers that identify and/or refer to each of the actual entities. While not shown in FIG. 4, it should be noted that some entities may also have associated state data.

In accordance with some configurations of the systems and methods disclosed herein, an automation server 102 may generate artificial automation data 440. As can be observed, the artificial automation data 440 may include artificial entity names (under "Artificial Name") and artificial device identifiers (under "Artificial ID #"). In this example, the artificial entity names are additional entity names that do not correspond to an actual entity. As can be observed in FIG. 4, the artificial entity names may be plausible entity names in some approaches. Additionally or alternatively, artificial entity names may be gibberish and/or meaningless. As can be observed in FIG. 4, the artificial device identifiers are not the same (e.g., are unequal to) to actual device identifiers for corresponding entities.

In the example of FIG. 4, the sent automation data 442 includes a mixture of actual and artificial entity names. The sent automation data 442 also includes the artificial device identifiers. The sent automation data 442 may be an example of automation data that may be sent from the automation server(s) 102 to the virtual assistant server(s) 124. In some cases, a virtual assistant server 124 may receive a signal associated with a user request that corresponds to an actual automation device 122. In this case, the virtual assistant server 124 may generate and send a query using the artificial device identifier. The automation server 102 may utilize the artificial device identifier to map the actual device identifier to the query. For example, assume that a user addresses a virtual assistant device 130 and says "turn off TV 1." The virtual assistant server 124 may receive a signal indicating the speech from the virtual assistant device 130. The virtual assistant server 124 may perform speech recognition, generate a query to deactivate TV 1 with device identifier 5, and send the query to the automation server 102. The automation server 102 may utilize the artificial device identifier (e.g., "5") to map the query to the actual device identifier (e.g., "101"). For example, the automation server 102 may replace the artificial device identifier with the actual device identifier in the query, or may re-generate a query with the actual device identifier. The automation server 102 may send the query to the automation controller 116, which may deactivate the automation device 122 with the actual device identifier of 101 (i.e., entity "TV 1").

Figure 5:
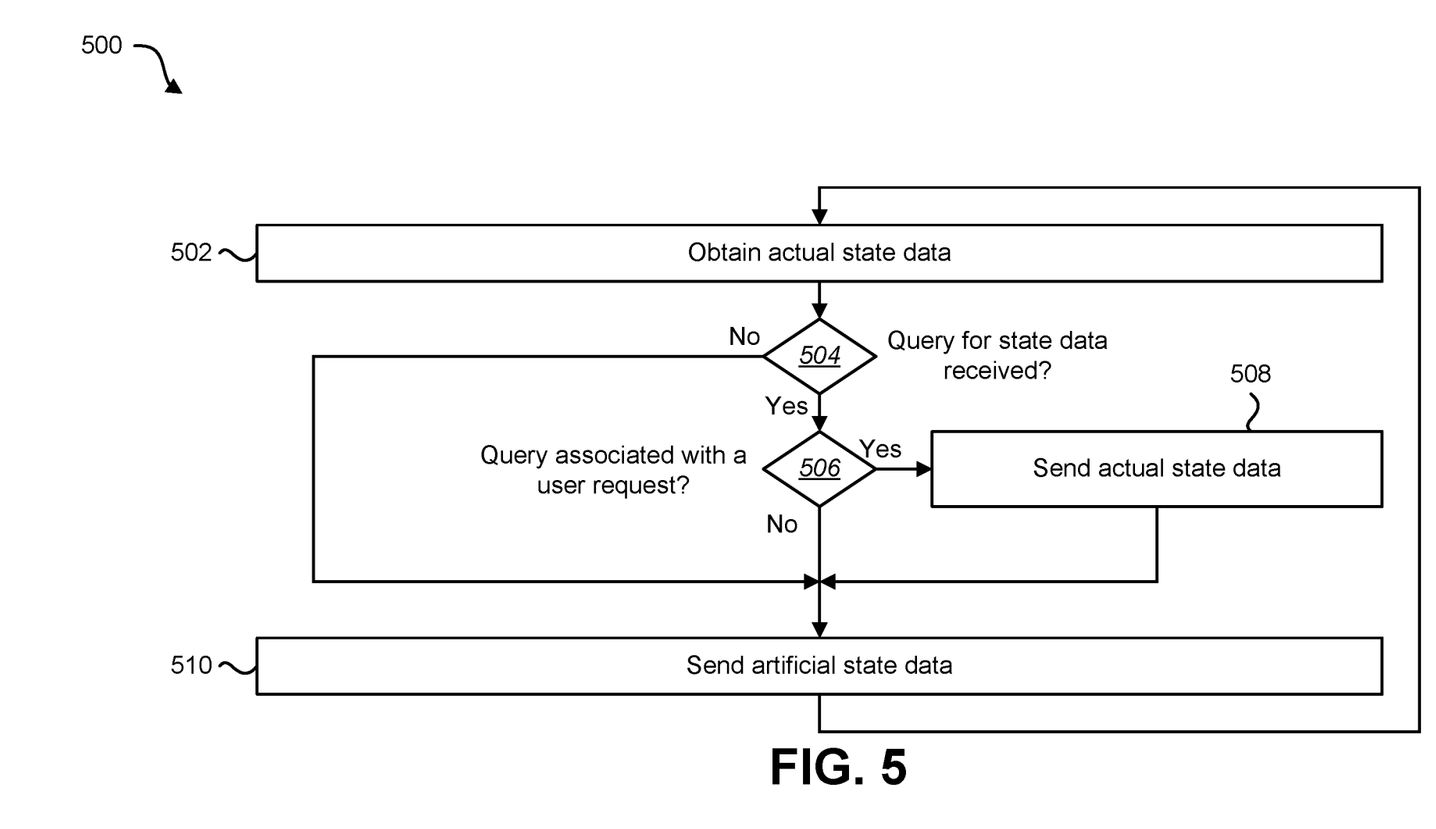
FIG. 5 is a flow diagram illustrating another more specific configuration of a method for generating artificial automation data to protect actual automation data.

FIG. 5 is a flow diagram illustrating another more specific configuration of a method 500 for generating artificial automation data to protect actual automation data. In some configurations, the method 500 may be performed by the one or more automation servers 102 described in connection with FIG. 1 or another device. The automation server 102 may obtain 502 actual state data. This may be accomplished as described in connection with FIG. 1. For example, the automation server 102 may request and/or receive actual state data corresponding to one or more automation devices 122 from an automation controller 116.

The automation server(s) 102 may determine 504 whether a query for state data is received. For example, the automation server 102 may determine whether a virtual assistant server has sent a query for state data that is received by a communication interface. In a case that a query for state data has not been received, the automation server(s) 102 may send 510 artificial state data. For example, the automation server(s) 102 may proactively send artificial state data without having received a query.

In a case that a query for state data is received, the automation server(s) 102 may determine 506 whether the query is associated with a user request. This may be accomplished as described in connection with FIG. 1. For example, the query may include a value or flag that indicates whether the query is associated with a user request. In a case that a query for state data is not associated with a user request (e.g., if the query does not indicate that it is associated with a user request), the automation server(s) 102 may send 510 artificial state data. For example, a virtual assistant server may send a query about a current state of one or more automation devices without being prompted by a user request. In this case, the automation server(s) 102 may send artificial state data in response to the query. For instance, the query may request state data that is specific to one entity or the query may request state data for multiple entities. The automation server(s) 102 may send artificial data corresponding to the request, where the artificial data is not necessarily the same as the actual state(s) for the one or more entities (or is different from the actual state(s) for the one or more entities).

In a case that the query is associated with a user request, the automation server(s) 102 may send 508 actual state data. For example, the automation server(s) 102 may send state data that indicates the state(s) for one or more entities indicated by the query. In some configurations, the automation server(s) 102 may send 510 artificial state data after sending 508 actual state data such that the actual state data is not provided for an extended period of time. Alternatively, the method 500 may proceed to repeat without sending artificial state data after sending 508 actual state data. It should be noted that one or more functions of the method 500 described in connection with FIG. 5 may be performed in combination with one or more functions of the method 300 described in connection with FIG. 3 in some configurations.

Figure 6:
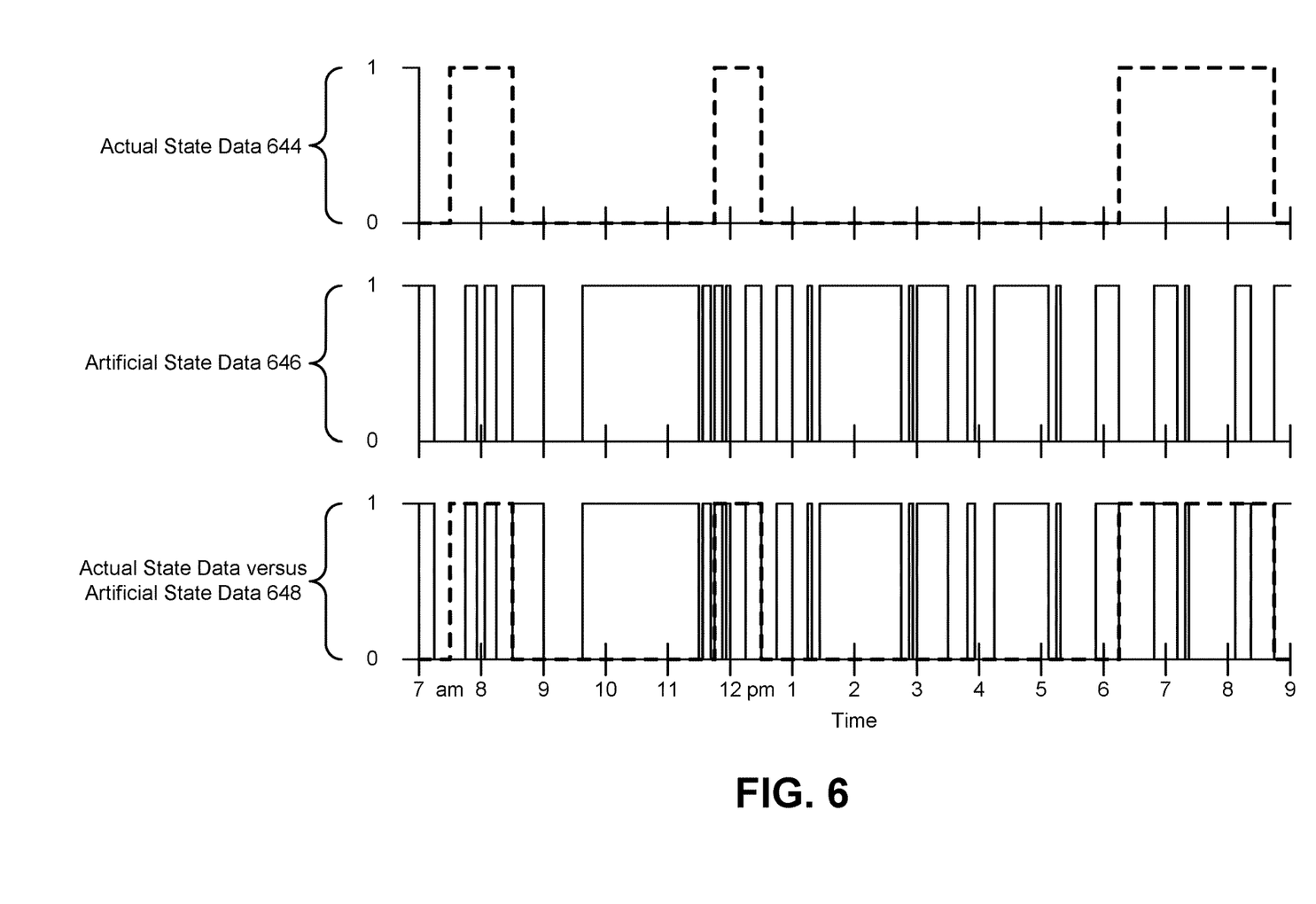
FIG. 6 is a diagram illustrating an example of actual state data and artificial state data in accordance with some configurations of the systems and methods disclosed herein.

FIG. 6 is a diagram illustrating an example of actual state data 644 and artificial state data 646 in accordance with some configurations of the systems and methods disclosed herein. Specifically, FIG. 6 illustrates three plots: a first plot illustrates actual state data 644 over time (i.e., time of day), a second plot illustrates artificial state data 646 over time, and a third plot illustrates actual state data versus artificial state data 648 over time. In the example illustrated in FIG. 6, the actual state data 644 includes binary states of a light switch. For instance, some automation devices that may have binary states may include light switches (e.g., 1 for an activated state and 0 for a deactivated state), door locks (e.g., 1 for a locked state and 0 for an unlocked state), door sensors (e.g., 1 for a closed state and 0 for an open state), window sensors (e.g., 1 for a closed state and 0 for an open state), etc. Other automation devices may have any number of states (e.g., channel numbers for a television, volume settings for an A/V receiver, dimming settings on a dimming switch, etc.).

In the example illustrated in FIG. 6, the actual state data 644 illustrates the actual states over time for a light switch. In this example, the light switch is activated at 7:30 am, deactivated at 8:30 am, activated at 11:45 am, deactivated at 12:30 pm, activated at 6:15 pm, and deactivated at 8:45 pm. As the state of the light switch is changed, the automation controller 116 may report the actual state data 644 to the automation server 102, which may store the actual state data 644 (e.g., the state and/or the times of state changes).

In accordance with some configurations of the systems and methods described herein, the automation server(s) 102 may generate artificial state data 646 and send the artificial state data 646 to the virtual assistant server(s) 124. As can be observed, the artificial state data 646 includes many artificial states and/or artificial state changes. This approach may make it difficult for the virtual assistant server(s) 124 and/or a person that is accessing the artificial state data 646 to discern the actual state data 644.

The third plot illustrates actual state data versus artificial state data 648 to illustrate some approaches to generating artificial state data. For example, at 7:30 am, assume that a user manually activates the light switch. The automation server(s) 102 may generate and send (e.g., report) an off state at 7:30 am. At 8:30 am, the user manually deactivates the light switch. The automation server(s) 102 may generate and send (e.g., report) an on state at 8:30 am. Shortly before 11:45 am, assume that the user asks a virtual assistant device 130 whether the light switch is turned on or off. Based on the user request, the virtual assistant server 124 sends a query to the automation server 102. Because the query is associated with a user request, the automation server 102 reports the actual state of the light switch at that time (i.e., off). At 11:45 am, the user asks the virtual assistant device 130 to turn on the light switch. The resulting query is associated with a user request, so the artificial state data 646 reflects the actual state data 644 at 11:45 am, although other artificial state changes are reported by the automation server 102 afterwards. At 12:30 am, the user asks the virtual assistant device 130 to turn off the light switch. The resulting query is associated with a user request, so the artificial state data 646 reflects the actual state data 644 at 12:30 pm, although other artificial state changes are reported by the automation server 102 afterwards. At 6:15 pm and 8:30 pm, the user manually switches the light, so the automation server 102 reports artificial state data 646 that is contrary to the actual state data 644 at those times.

As can be observed from this example, the actual state data 644 may not be readily discernible based on the artificial state data 646 alone. In the example of FIG. 6, the artificial state data 646 includes many random artificial state changes. This may make discerning actual state change timing (e.g., patterns) difficult. In other examples, the artificial state changes may conform to an artificial pattern. For instance, the automation server 102 may generate periodic artificial state changes in some approaches, which may cause non-actual timing (e.g., a non-actual pattern) to be observed and/or discerned.

Figure 7:
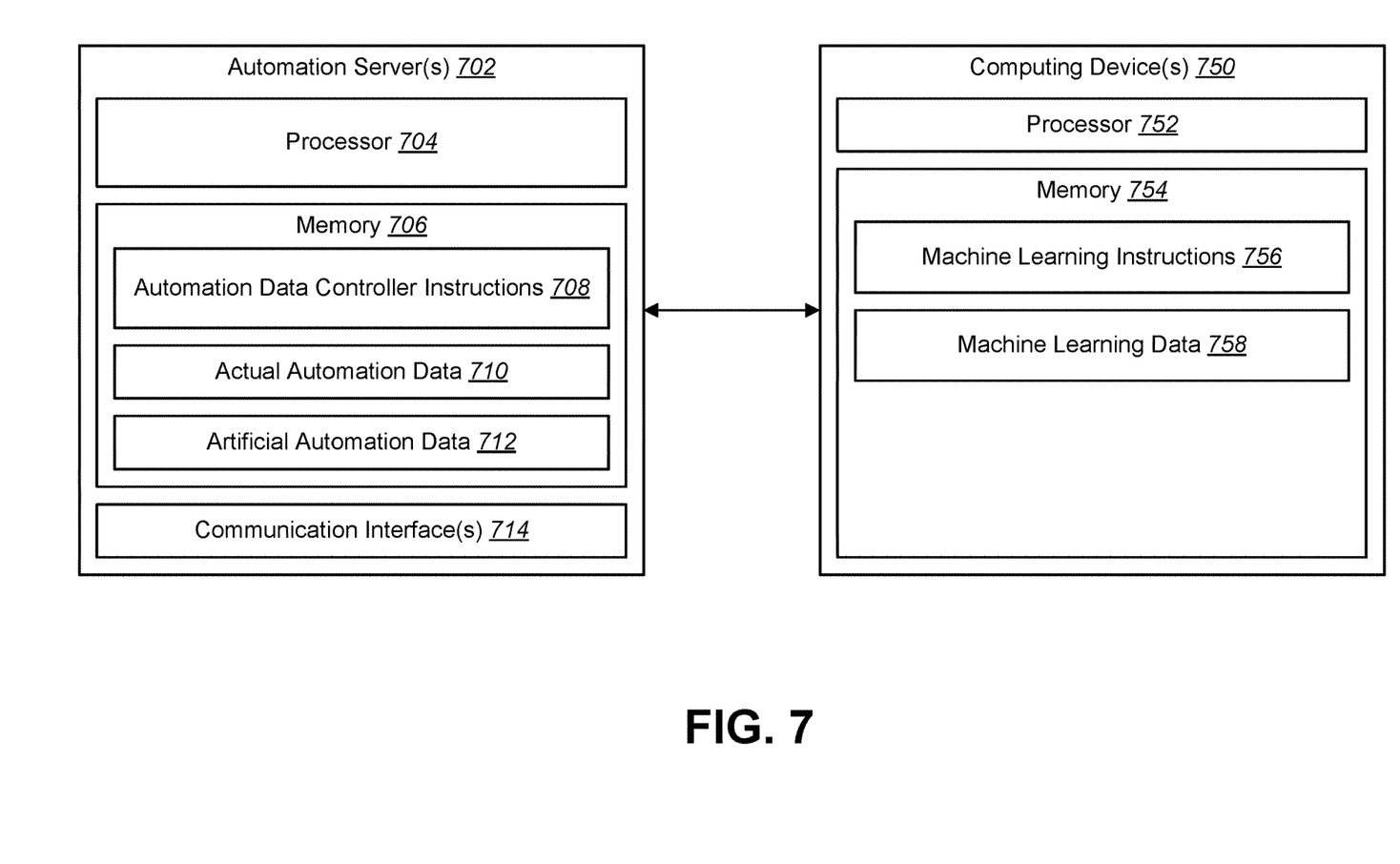
FIG. 7 is a block diagram illustrating an example of automation server(s) and computing device(s)

FIG. 7 is a block diagram illustrating an example of automation server(s) 702 and computing device(s) 750. The automation server(s) 702 described in connection with FIG. 7 may be an example of the automation server(s) 102 described in connection with FIG. 1. For example, each of the automation server(s) 702 may include a processor 704 (or processors), a memory 706 (or memory devices), and/or communication interface(s) 714. The memory 706 may include automation data controller instructions 708, actual automation data 710, and/or artificial automation data 712. One or more of the components or elements of the automation server(s) 702 described in connection with FIG. 7 may operate similarly to corresponding components or elements described in connection with FIG. 1.

The example of FIG. 7 illustrates one or more computing devices 750. Examples of the computing devices 750 may include virtual assistant servers, other servers, computers, server farms, etc. Each of the computing device(s) 750 may include a processor 752 (or processors) and memory 754 (or memory devices). For example, the memory 754 may include machine learning instructions 756 and machine learning data 758.

The processor 752 may execute the machine learning instructions 756 to perform machine learning based on the machine learning data 758. Examples of machine learning may include artificial neural networks, supervised learning (e.g., classification, regression, support vector machines (SVMs), etc.), unsupervised learning (e.g., clustering), etc. For example, the machine learning instructions 756 may be executed to discern patterns in the machine learning data 758 and/or to make decisions based on the machine learning data 758. For instance, the computing device(s) 750 may be configured to perform machine learning based on automation data in order to discern patterns in the automation data (e.g., automation device usage patterns, preferred channels, numbers of automation devices, types of automation devices, building structure (such as number and types of rooms, for example), etc.).

In some configurations of the systems and methods disclosed herein, the machine learning data 758 may be based on the artificial automation data 712. For example, the automation server(s) 702 may provide the artificial automation data 712 to the computing device(s) 750 directly or indirectly. For instance, the automation server(s) 702 may send the artificial automation data 712 to one or more virtual assistant servers, which may send the received artificial automation data (or data based on the received artificial automation data) to the computing device(s) 750. Some configurations of the systems and methods described herein may hinder machine learning from discerning accurate patterns and/or from making accurate decisions from the machine learning data 758. For example, because the artificial automation data 712 does not necessarily reflect the actual automation data 710, machine learning may be unable to produce a useful or meaningful output. For instance, the artificial automation data 712 may serve as noise in the machine learning process. The resulting noise level in the machine learning data 758 may be such that accurate learning may be difficult. As discussed above, this may protect the actual automation data 710 (and user privacy and/or safety, for example).

Figure 8:
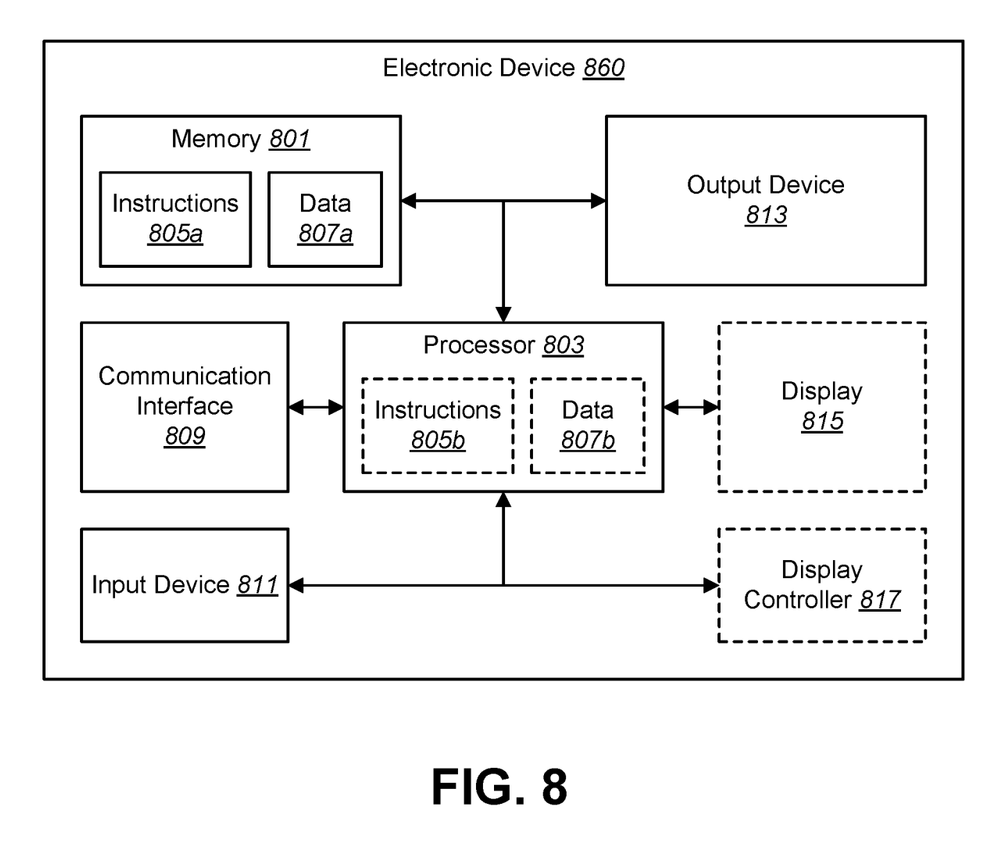
FIG. 8 illustrates various components that may be utilized in an electronic device.

FIG. 8 illustrates various components that may be utilized in an electronic device 860. The electronic device 860 described in connection with FIG. 8 may be configured in accordance with one or more of the devices (e.g., automation server(s) 102, 702, automation controller(s) 116, control devices, virtual assistant server(s) 124, virtual assistant device(s) 130, computing device(s) 750, etc.) described herein. For example, the electronic device 860 may be configured to perform one or more of the methods 200, 300, 500 described herein. The electronic device 860 may include a memory 801, a communication interface 809, an input device 811, a processor 803, an output device 813, a display 815, and/or a display controller 817. The memory 801 may store instructions 805a and data 807a. The processor 803 may operate on instructions 805b and data 807b. It should be noted that the display 815 and/or display controller 817 may not be included in some configurations. For example, some configurations of the electronic device 860 may not have a display. Additionally or alternatively, some configurations of the electronic device 860 may include a microphone (e.g., an input device 811) and a speaker (e.g., an output device 813). Some configurations of the electronic device 860 may be controlled by a control device (e.g., virtual assistant device, a smart speaker, a touch panel, smart phone, etc.) with communication through a wired or wireless link (e.g., WLAN).

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory may be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The term "computer-readable medium" refers to any available medium that can be accessed by a computer or processor. A computer-readable medium may be non-transitory and tangible. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes, and variations may be made in the arrangement, operation, and details of the systems, methods, and apparatus described herein without departing from the scope of the claims.

What is claimed is:

1. An automation server for communicating automation data with; (1) any number of any of virtual assistant devices and virtual assistant servers; and (2) a home automation network (AN) having any number of identifiers (IDs) associated with or indicating a home user or the home AN, the home AN having any number of any of automation controllers (ACs), automation devices (ADs), and virtual assistant devices, the automation server including circuitry comprising:

a communication interface, a processor, and a memory, configured to:
obtain, from at least a first AC associated with at least a first AD, first automation data including information indicating: (1) identifiers (IDs) of one or more ADs associated with the home user, and (2) associated digital audio information for a home user request voiced by the home user;
generate second automation data according to the first automation data by mapping the second automation data to the first automation data according to a first set of IDs of the one or more ADs associated with the home user, the second automation data comprising a second set of IDs of the one or more AN devices generated to be different than the first set of IDs for hindering machine learning; and
send, to at least one virtual assistant server, the second automation data,
wherein the automation server is configured to determine whether a user request indicated by the first automation data is associated with private automation data, and
wherein any of the second automation data include or are associated with any of IDs or data that are both: (1) associated with the automation devices; and (2) associated with or indicated as private automation data.

2. The automation server of claim 1, wherein the private automation data from among the first second automation data and the second automation data, only the second automation data is available to the at least one virtual server.

3. The automation server of claim 1, wherein the private automation data is any of: (1) IDs of the AN devices, (2) an ID identifying or indicating the home user, and (3) any of control data and state data.

4. The automation server of claim 3, wherein any of the control data and the state data include information: (1) associated with the home user; and (2) indicating any of: (a) control data associated with any of an operation, a configuration, a control, and control information, for an automation device, and (b) state data associated with one or more of any of an automation controller, an automation device, and a virtual assistant device.

5. The automation server of claim 4, wherein the control data associated with any of a query, an instruction, a commands, a requests, and code associated with the home user includes information associated with any of: deactivating a light, changing a thermostat temperature starting a dish washer, changing a television channel, activating a game console, playing music, activating a security system, adjusting a camera angle, capturing video, accessing a computer, and activating a sprinkler system.

6. The automation server of claim 4, wherein the state data associated with any of a query, an instruction, a commands, a requests, and code associated with the home user includes information for any of: a light state, a thermostat temperature, dish washer state as any of open, running, wash complete, a current television channel, a current game console state, an A/V receiver state, a security system state, a sprinkler system state, a door state, and a lock state.

7. The automation server of claim 6, further configured to, on condition that a query from the at least one virtual assistant server is associated with a user request, provide the state data in response to determining that the query is associated with the user request.

8. The automation server of claim 6, wherein the includes artificial state data including any number of artificial state changes.

9. The automation server of claim 8, wherein the artificial state data is sent in response to a query from the at least one virtual assistant server that is not associated with the user request.

10. A method performed by an automation server for communicating automation data with: (1) any number of any of virtual assistant devices and virtual assistant servers; and (2) a home automation network (AN) having any number of identifiers (IDs) associated with or indicating a home user or the home AN, the home AN having any number of any of automation controllers (ACs), automation devices (ADs), and virtual assistant devices, the automation server including circuitry including a communication interface, a processor, and a memory, the method comprising:
   obtaining, from at least a first AC associated with at least a first AD, first automation data including information indicating: (1) identifiers (IDs) of one or more ADs associated with the home user, and (2) associated digital audio information for a home user request voiced by the home user;
   generating second automation data according to the first automation data by mapping the second automation data to the first automation data according to a first set of IDs of the one or more ADs associated with the home user; and
   providing, to at least one virtual assistant server, the second automation data,
   wherein the second automation data comprising a second set of IDs of the one or more AN devices is generated to be different than the first set of IDs,
   wherein, the automation server is configured to determine whether a user request indicated by the first automation data is associated with private automation data, and
   wherein any of the second automation data include or are associated with any of IDs or data that are both: (1) associated with the automation devices; and (2) associated with or indicated as private automation data.

11. The method of claim 10, wherein the private automation data is any of: (1) IDs of the AN devices, (2) an ID identifying or indicating the home user, and (3) any of control data and state data.

12. The method of claim 10, wherein the private automation data that is any of: (1) IDs of the AN devices and (2) an ID identifying or indicating the home user, includes information indicating any of: when a user is at home or away, when and what types of media are consumed by a user, a number of bedrooms in a user's home, which rooms are occupied, current room occupants, any of a number or type of automation devices in a user's home, when a home or business is secure, a security camera video feed, when a bathroom is used, and a user's search interests.

13. The method of claim 12, wherein the private automation data includes information indicating any of artificial device IDs and artificial entity names.

14. The method of claim 10, further comprising determining whether a query from the at least one virtual assistant server is associated with a user request.

15. The method of claim 14, wherein, on condition that the query from the at least one virtual assistant server is not associated with a user request, the state data includes information indicating at least one artificial state change.

16. The method of claim 14, wherein, on condition that a query from the at least one virtual assistant server is associated with a user request, sending actual state data in response to determining that the query is associated with the user request.

17. A non-transitory computer-readable medium, the computer-readable medium comprising executable instructions for:
   receiving, by an automation server from a first automation controller (AC) associated with a first automation device (AD), first data including information indicating: (1) identifiers (Ds) of one or more ADs associated with the home user, and (2) associated digital audio information for a home user request voiced by the home user;
   generating second automation data according to the first automation data network device by mapping the second automation data to the second automation data according to a first set of IDs of the one or more ADs associated with the home user; and
   sending, to at least one virtual assistant server, the second automation data,
   wherein the second automation data comprising a second set of IDs of the one or more AN devices is generated to be different than the first set of IDs,
   wherein, the automation server is configured to determine whether a user request indicated by the first automation data is associated with private automation data, and
   wherein any of the second automation data include or are associated with any of IDs or data that are both: (1) associated with the automation devices; and (2) associated with or indicated as private automation data.

18. The computer-readable medium of claim 16, wherein the second automation data comprises artificial device identifiers, artificial entity names, or artificial state data, and
   wherein the second automation data is inaccurate for hindering machine learning based on the second automation data.

* * * * *